United States Patent [19]

Dudgeon et al.

[11] Patent Number: 5,790,792
[45] Date of Patent: Aug. 4, 1998

[54] METHOD AND APPARATUS FOR TRANSMITTING MULTIMEDIA DATA FROM AND APPLICATION LOGIC SERVER TO INTERACTIVE MULTIMEDIA WORKSTATIONS

[75] Inventors: Michael Dudgeon, Kennesaw; Michael Finley, Duluth; Thomas Tooley, Alpharetta; John Wade, Atlanta, all of Ga.

[73] Assignee: Radiant Systems, Inc., Alpharetta, Ga.

[21] Appl. No.: 707,466

[22] Filed: Sep. 4, 1996

[51] Int. Cl.⁶ .................................................. G06F 13/00
[52] U.S. Cl. ................... 395/200.42; 395/200.61
[58] Field of Search ............................ 395/501, 509, 395/326, 327, 339, 670, 671, 672, 200.3, 200.48, 200.38, 200.43, 200.47, 200.8, 250, 200.42, 200.49, 200.57, 200.61, 200.33, 680

[56] References Cited

U.S. PATENT DOCUMENTS

| | | | |
|---|---|---|---|
| 5,555,378 | 9/1996 | Gelman et al. | 395/200.65 |
| 5,577,258 | 11/1996 | Cruz et al. | 395/200.49 |
| 5,603,058 | 2/1997 | Belknap et al. | 395/855 |
| 5,623,308 | 4/1997 | Civanlar et al. | 348/392 |
| 5,625,404 | 4/1997 | Grady et al. | 348/7 |
| 5,659,793 | 8/1997 | Escobar et al. | 345/302 |
| 5,671,225 | 9/1997 | Hooper et al. | 370/468 |

*Primary Examiner*—Parshotam S. Lall
*Assistant Examiner*—Viet Vu
*Attorney, Agent, or Firm*—Needle & Rosenberg, P.C.

[57] ABSTRACT

The present invention is directed to a system comprising one or more multimedia workstations, a high-speed data network, and one or more multimedia servers and associated multimedia network adapters. The server of the present invention may be implemented to be responsible for almost all data processing functionality, relieving the client workstation of this responsibility, and allowing the workstation to serve instead as a repository for multimedia data. In one embodiment, true color pictures, graphic images, etc. are sent directly by the server to each workstation over a high-speed data network with no processing or encoding. For example, a 640×480×16 bit/pixel image could be sent at 640×480×2=614,400 bytes of network data. The workstation client needs to perform no substantive processing on the data in order to display it on a video display. Rather, the workstation needs only to store the data to a local graphics frame buffer. For MPEG data, the client simply receives the raw data and passes it to a hardware decoder on the board, thus avoiding any need for software processing.

14 Claims, 6 Drawing Sheets

FIG. 6

| DESTINATION ADDRESS (1 BYTE) | SOURCE ADDRESS (1 BYTE) | SEQUENCE NUMBER (1 BYTE) | PACKET NUMBER (1 BYTE) | MESSAGE TYPE (1 BYTE) | PRIORITY (1 BYTE) | DATA LENGTH (2 BYTES) | MAC DATA (4 BYTES) | USER DEFINED (4 BYTES) |
|---|---|---|---|---|---|---|---|---|
| 671 | 672 | 673 | 674 | 675 | 676 | 677 | 678 | 679 |

| DATA (0...4096 BYTES) |
|---|
| 680 |

FIG. 7

| STEP | WORKSTATION #N | NETWORK | SERVER |
|---|---|---|---|
| 701 | USER PRESSES TOUCHSCREEN | | |
| 702 | RAW SERIAL DATA RECEIVED ON WORKSTATION SERIAL PORT | | |
| 703 | DATA QUEUED FOR SENDING TO SERVER | | |
| 704 | | | TIMER INDICATES POLLING CYCLE ACTIVE |
| 705 | | | GENERATE POLL TO WORKSTATIONS |
| 706 | | ·····POLL MESSAGE | |
| 707 | APPEND RAW SERIAL DATA POLL MESSAGE | | |
| 708 | | POLL ANSWER·····► | |
| 709 | | | RAW DATA FROM WORKSTATION #N SENT TO HANDLING APPLICATION |
| 710 | | | RAW DATA PROCESSED INTO TOUCH POINT |
| 711 | | | APPLICATION MAKES DECISION ON CHANGE OF STATE |
| 712 | | | APPLICATION QUEUES RAW DATA OF GRAPHICS IMAGE FOR STATION #N |
| 713 | | | ARBITRATION FOR BANDWIDTH TO WORKSTATION #N |
| 714 | | ·····GRAPHICS DATA | PACKETIZATION OF DATA |
| 715 | | | PACKETIZATION OF DATA |
| 716 | | ·····GRAPHICS DATA | PACKETIZATION OF DATA |
| 717 | DIRECTLY COPY GRAPHICS DATA TO VIDEO FRAME BUFFER | | |

METHOD AND APPARATUS FOR TRANSMITTING MULTIMEDIA DATA FROM AND APPLICATION LOGIC SERVER TO INTERACTIVE MULTIMEDIA WORKSTATIONS

BACKGROUND OF THE INVENTION

1. Field of the Invention

The present invention relates generally to a system for transmitting multimedia content over a high-speed data network, and more specifically to a system for transmitting real-time graphics images from a graphics server to one or more multimedia workstations.

2. Description of the Prior Art

The field of computer workstations involves providing a human user with the ability to conduct a session with an electronic computer and perform useful work, do business, or engage in recreation. A primary feature of a computer workstation is the one to one match between current function and its user. For example, at any particular time a user can command his computer to play a particular game. This session is not necessarily dependent upon the actions or states of other computers where other users are conducting sessions of the same or of a different function, although a workstation may provide access to remote resources as needed by the user.

The prior art discloses client-server architectures, where the client workstation is dependent on the state of the server and where each client workstation is independent of the other clients. In this configuration, the server is not generally referred to as a workstation; it is not an independent embodiment of function to a user.

The prior art also discloses many devices and functions in the general field of multimedia. In simple terms, "multimedia" is a type of computer technology which provides user input and output which is more closely tied to the natural human world that the plain text and keyboard of the bulk of prior art computer systems. Multimedia technology allows a user to interact with, for example, true-color pictures, true color video, speech generation, speech recognition, pointer input devices such as a mouse and a touchscreen, and realistic audio or music generation.

The prior art reveals multitudes of multimedia workstations. The prior embodiments of these workstations typically involves a multi-purpose computer with motherboard, various plug-in cards for input/output (I/O) and video functions, a power supply, hard disk, CD ROM, video monitor, pointing device, keyboard, chassis, etc. In order to provide an interactive video, graphics, and audio session, the prior art multimedia device may contain mass storage and moving parts. These moving parts are necessitated by the current state of the art in mass storage, and may comprise rotating platter hard disk drives and rotating optically read disks e.g. CD ROMs. A fan or pump for cooling fluid is usually necessary in prior art multimedia computers to maintain the power supply for the typical workstation. The moving parts and mass storage are the primary points of failure for the prior art workstation by orders of magnitude over the solid state components.

Further, these prior workstations have many points of connection between the motherboard computer and the various I/O cards which provide the capability for multimedia. These connections also are points of failure. The mass storage necessary for reproduction of motion video and true color pictures is difficult to maintain in environments where multiple workstations each hold a copy of information needed to perform multimedia functions. As the information is updated from time to time, it must be distributed to each workstation, leading to simultaneous distribution and synchronization failures.

Additionally, prior art multimedia systems either generate the multimedia locally at the client from local mass storage or they receive highly encoded information from the server. The ICA protocol and the X terminal protocols are examples of encoded protocols where graphics information is encoded and compressed for network transmission. Neither of these protocols directly support MPEG or other motion video standards, and these protocols require significant software running at the workstation to interpret the encoded commands.

There is therefore a significant need in the art for a high-performance multimedia transmission and distribution system which is simple, reliable and inexpensive in design, yet can be implemented in a networked environment with as few or as many workstations as necessary. The present invention overcomes the limitations found in prior art multimedia systems, as described in further detail below.

SUMMARY OF THE INVENTION

The present invention is directed to a system comprising one or more multimedia workstations, a high-speed data network, and one or more multimedia servers and associated multimedia network adapters. Unlike prior art systems, the server of the present invention may be implemented to be responsible for almost all data processing functionality, relieving the client workstation of this responsibility, and allowing the workstation to serve instead as a repository for multimedia data.

In one embodiment, true color pictures, graphic images, etc. are sent directly by the server to each workstation over a high-speed data network with no processing or encoding. For example, a 640×480×16 bit/pixel image could be sent at 640×480×2=614,400 bytes of network data. The workstation client needs to perform no substantive processing on the data in order to display it on a video display. Rather, the workstation needs only to store the data to a local graphics frame buffer. For MPEG data, the client simply receives the raw data and passes it to a hardware decoder on the board, thus avoiding any need for software processing.

Data transmission to peripherals on the workstation may work in a similar manner. In this case, the server may send to the workstation via the high-speed data network the formatted data that the peripheral expects, and the workstation may thereafter simply pass it unfiltered to the peripheral, which may be found on, for example, a serial port.

Input from a workstation pointing device, and/or other analogous input peripheral, may also be received by the workstation, and may be treated as raw data and transmitted unfiltered and unprocessed to the server via the network. This input may thereafter be used by the server to determine what multimedia content is transmitted back to the workstation.

The network may have very high bandwidth to support real time delivery of graphics and peripheral information. For example, the data network for a system with 10 workstations may be configured to support at least a 6 megabytes per second transmission rate in order to support updating each full 640×480 screen in one second. Further the network protocol may be structured such that the server or servers have total control over bandwidth allocation, allowing for maximum efficiency since almost all traffic is in the outbound (server to workstation) direction. The workstations may be polled devices, in one embodiment, only returning input at structured times determined by the server(s). Additionally, a network adapter connecting the server to the high-speed data network may allow for direct memory access (DMA) transfers from host memory to the network. This may allow for maximum efficiency in that the server central processing unit (CPU) does not need to be directly involved in the transfer of the bulk data.

The invention also allows for more than one server in a system to provide balancing of processing load and to provide fault tolerance when one server may fail.

BRIEF DESCRIPTION OF THE FIGURES OF THE DRAWINGS

FIG. 6 illustrates the format of a data packet transmitted in one embodiment of the present invention.

FIG. 7 is a timing diagram illustrating data transmission that may be implemented in one embodiment of the present invention.

DETAILED DESCRIPTION OF THE INVENTION

Figure 1:
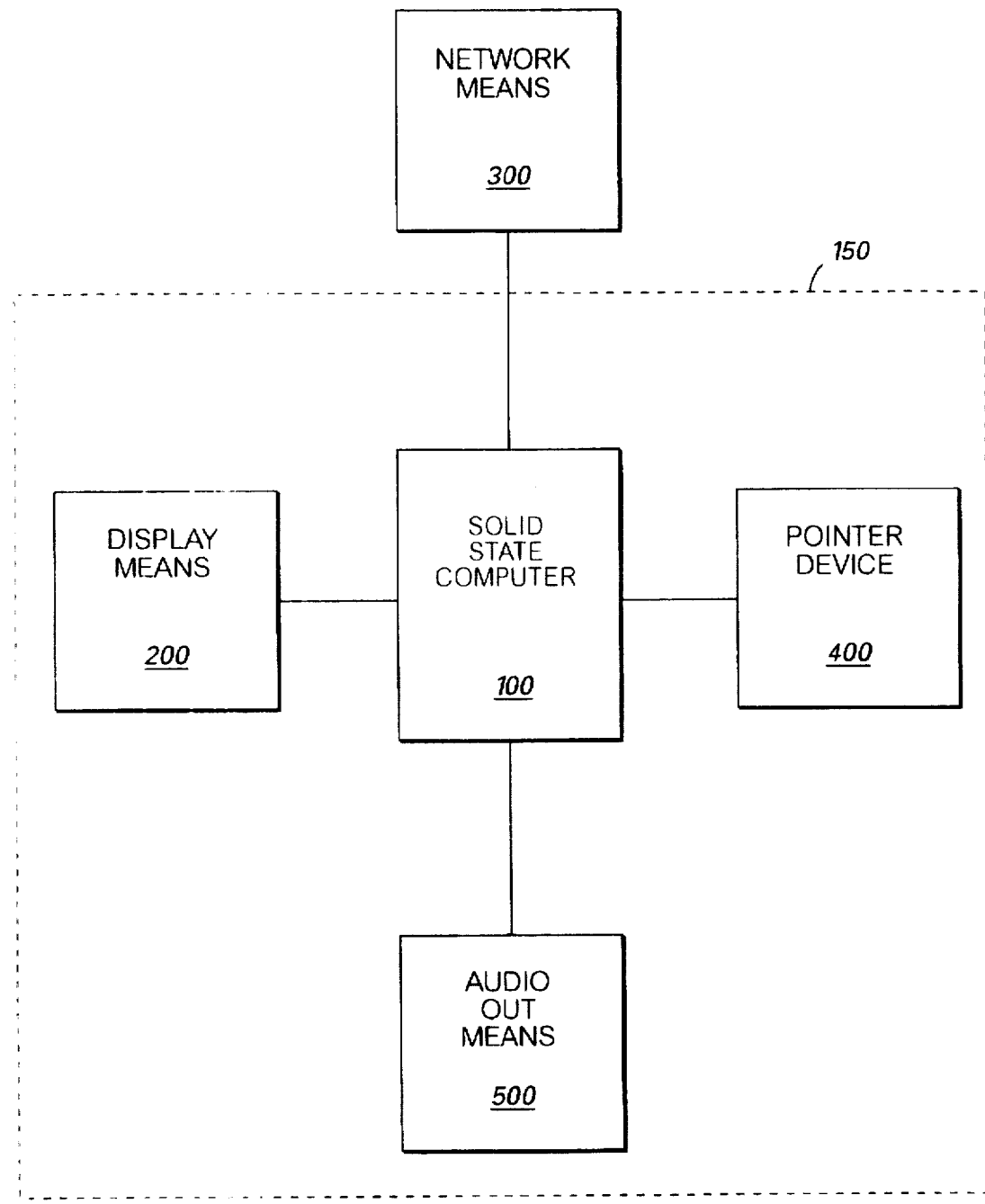
FIG. 1 is a block diagram illustrating the basic components of a multimedia workstation and network connection that may be used to implement the present invention.

FIG. 1 shows a basic block diagram of a multimedia workstation 150 in a preferred embodiment. The workstation of FIG. 1 may include a solid state computer 100, a display means 200, a pointer device 400, and an audio out means 500. Multimedia workstation 150 may be coupled to high-speed data network 300.

In one embodiment, display means 200 may be an active matrix unit capable of displaying 16 bit RGB color. This implies 5 bits per pixel for the red color brightness, 6 bits per pixel for the green color brightness, and 5 bits per pixel for the blue color brightness. The LCD accepts digital RGB data, horizontal sync, and vertical sync signals from the computer. Those skilled in the art will recognize that an active 16 bit RGB LCD is capable of showing true color and photo-realistic images.

Another embodiment of the display means 200 may be a super VGA quality CRT monitor, or equivalent. These monitors accept analog RGB, horizontal sync, and vertical sync from the computer. A super VGA quality monitor is also known by those skilled in the art to be capable of showing true color and photo-realistic images.

Yet another display means 200 may be a standard television. A television may accept, for example, a composite NTSC (U.S.A) or PAL (European) signal from the computer. The NTSC and PAL standards are well known in the art and need not be discussed here.

The high-speed data network 300 may be a 200 Megabit per second fiber optic network, in one embodiment. Such a network 300 allows the high data rates necessary for transmitting multimedia presentation information from a remote server 600 (described in further detail below) to the multimedia workstation 150. Alternate embodiments of the network 300 include, but are not limited to, 100 Mbs Fast Ethernet, ATM, or other high speed networks designed to carry real time video and audio information.

The pointer device 400 may be a touchscreen, which is a device which senses the touch of a human finger or dedicated stylus on the display means 200. A relative coordinate of the touch may be transmitted to the computer 100 via a serial data connection, or the like. Alternate embodiments of the pointer device include, but are not limited to, a mouse, light pen, joystick, retina tracking device, motion tracking device, signature capture device, keyboard, etc.

The audio out means 500 may be a single 8 ohm speaker. The computer 100 may send signals to the speaker 500 via an analog waveform over two wires. Other embodiments of the audio out means 500 include, but are not limited to, stereo equipment, VCR or television line level inputs, amplified speakers, etc.

Figure 2:
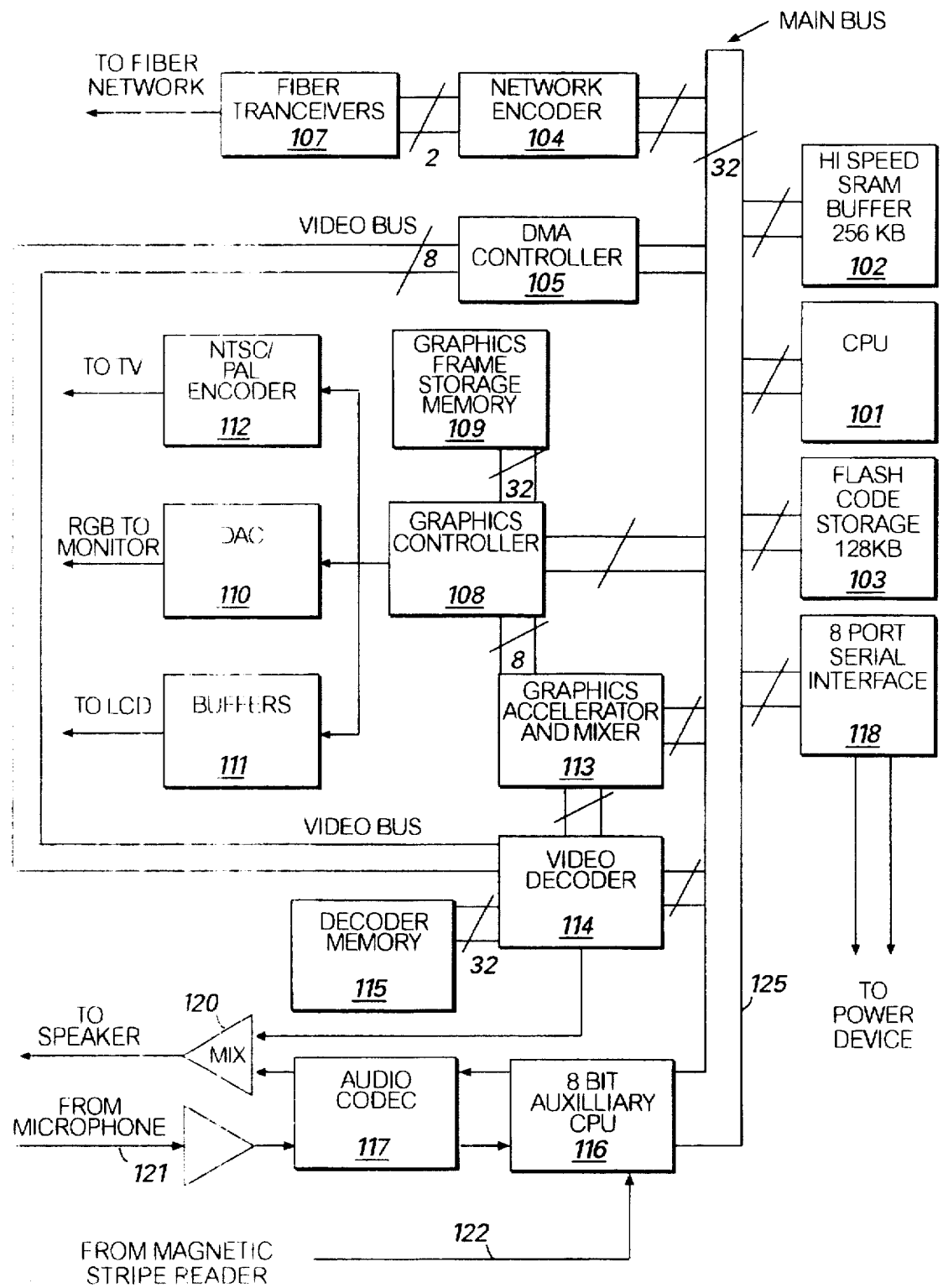
FIG. 2 is a schematic diagram of the preferred embodiment of the multimedia workstation of FIG. 1.

FIG. 2 shows a more detailed illustration of the computer 100 of the multimedia workstation 150 depicted in FIG. 1. The computer of FIG. 2 may be a single electronic printed circuit (PC) board approximately 10 inches square. This small single board design provides for easy upgrades, locating the invention in space restrictive locations, and simple replacement after a failure. Of course, one of ordinary skill in the art will recognize that the computer 100 may be implemented in a variety of ways, including as a single integrated circuit.

Referring to FIG. 2, the computer is run by an embedded CPU 101. This CPU may or may not be of the Intel x86, PowerPC, DEC Alpha, or other mainstream CPU families found in prior art workstations. In one embodiment, the embedded CPU 101 is a 32 bit device from the Intel i960 family. The CPU 101 is responsible for controlling the workstation 150 and routing data from the network 300 to the appropriate output device and for periodically reporting the state of the input devices to the network 300.

256 Kilobytes of static RAM (SRAM), or any other suitable amount, may be used for high speed memory 102. A 32 bit wide word of memory is burst accessible from memory every 50 nanoseconds in one embodiment. This provides a burst bandwidth of 80 Megabytes per second and a sustained rate of 53 Megabytes per second. The memory 102 is used primarily for network buffering, code execution, and code data storage.

The software for the workstation 150 may be stored in a 128 Kilobyte FLASH device 103, or equivalent. This software is executed by the CPU 100 to control the workstation 150. As known to those skilled in the art, the FLASH device may be reprogrammed up to 10,000 times, and the present invention may be implemented to load new images of software to the FLASH 103 over the network 300.

A network encoder 104 is included to connect the CPU 100 and memory 102 to the fiber optic network 300. The encoder may be implemented to take 200 Megabit serial data from the fiber transceivers 107 and convert the data to useful 32 bit words of data suitable for the CPU 100 or DMA 105 controllers. The encoder 104 may comprise a Triquint 9103 10/8 Fiber Channel ENDEC and a Xilinx 4000E series FPGA which handles addressing and low level network protocol. The CPU 100 may program the encoder 104 with the appropriate address for the network and protocol options.

The DMA controller 105 is implemented in the Xilinx 104 FPGA and has three responsibilities: moving data directly from the network encoder 104 to the high speed SRAM 102, moving data from the SRAM 102 directly to the network encoder 104, and moving data from the SRAM 102 to the video decoder 114. As known to those skilled in the art, a DMA controller 105 moves data directly on the system bus 125 without use of CPU bus cycles.

Again, the preferred display means 200 may include an LCD, monitor, or television. The computer 100 may be implemented to interface with any of these display types. The graphics controller 108 may be a Tseng Labs W32p IC which accepts pixel and color information from the CPU bus 125 and stores it in a graphics frame buffer 109. In one embodiment, the frame buffer 109 may be 2 Megabytes of DRAM. The primary resolution of the displays 200 may be 640 horizontal pixels by 480 vertical pixels, each pixel being a 16 bit RGB value. 16 bit RGB is known by those in the art to be 5 bits for red brightness, 6 for green, and 5 for blue. This display format requires 640×480×16 bits or 614,400 bytes to store a frame on the screen. Since frame buffer 109 may comprise 2 Megabytes of DRAM, the frame buffer 109 may have space to store three separate frame images, thus improving graphics and video performance.

The graphics controller 108 is responsible for panning the frame buffer 109 at a screen refresh rate and sending digital pixel data to the Digital to Analog (DAC) converter 110, buffers 111, and NTSC/PAL converter 112. The DAC 110 converts the pixel data to analog RGB signals which are used to drive a video display monitor 200. Specifically, the buffers 111 redrive the signals to an active matrix LCD display 200, or other type of display. Alternatively, the NTSC/PAL encoder 112 takes the data and makes a composite signal to drive a television 200.

The video decoder 114 is an integrated circuit (IC) which takes digitally compressed data and decompresses it to a motion video stream. A preferred embodiment of the video decoder 114 may be a member of the LSI Logic 64000 family which takes as input MPEG I or II encoded data. As known to those skilled in the art, MPEG I and II are widely used standards for the compression of motion video as adopted by the Motion Pictures Expert Group. The compression of the video images allows real time transmission of the images over the fiber network 300 from the remote mass storage device 650 coupled to the server 600. In order to perform the decompression, the decoder 114 may use 2 Megabytes of DRAM memory 115. Simultaneously with the output of the video data, the video decoder 114 decompresses a synchronized MPEG audio stream and outputs it to mixer/amplifier circuitry 120 which goes to the audio output means 500.

The video decoder 114 accepts input encoded data from the DMA controller 105 and sends decoded YUV data to the graphics accelerator and mixer 113. As known to those skilled in the art, YUV is the chromatic space used by the television standards for encoding color. The preferred embodiment of the accelerator/mixer is the Tseng Labs Viper FX, which converts the YUV data to RGB, scales the video either larger or smaller than the native size, and sends the data to the graphics frame buffer 109 with the cooperation of the graphics controller 108. The display architecture allows either motion video, standard graphic images, or combinations of both to be routed to the display means.

The present invention may include an 8 bit auxiliary CPU 116, such as the Microchip PIC16C74 in one embodiment. This small, inexpensive microprocessor serves as a master control for the hardware on the board, resets the board in an orderly manner, and communicates to the audio CODEC 117, which may be a Texas Instruments TI32002 that allows 14 bit per sample record and playback of audio data. The audio out data is provided from the main CPU 101 though the auxiliary CPU 116 and to the audio CODEC 117, where it is converted to analog and mixed and amplified to the audio out means 500. A microphone 121 can be connected and digitized through the CODEC 117 with the reverse of the data path for the audio out. The auxiliary CPU 116 also has a dedicated interface to a Magnetic Stripe Decoder 122 for reading credit cards and similar items.

Eight (or more or less) serial expansion ports 118 may also be also provided. These may be constructed with TI 16C554 UARTs and RS232 line drivers. These ports 118 enable the workstation 150 to connect to a variety of peripherals which match the user's particular needs. Although these expansion ports 118 are not absolutely necessary to achieve the multimedia workstation 150 functions, they provide much greater flexibility to the user. These serial ports 118 offer connectivity from the invention to printers, scanners, etc.

The main interconnection means for parts on the control computer 100 may be a 32 bit bus 125. Various 8 and 16 bits buses also exist to transport display and digital data in various stages of encoding and decoding.

Figure 3:
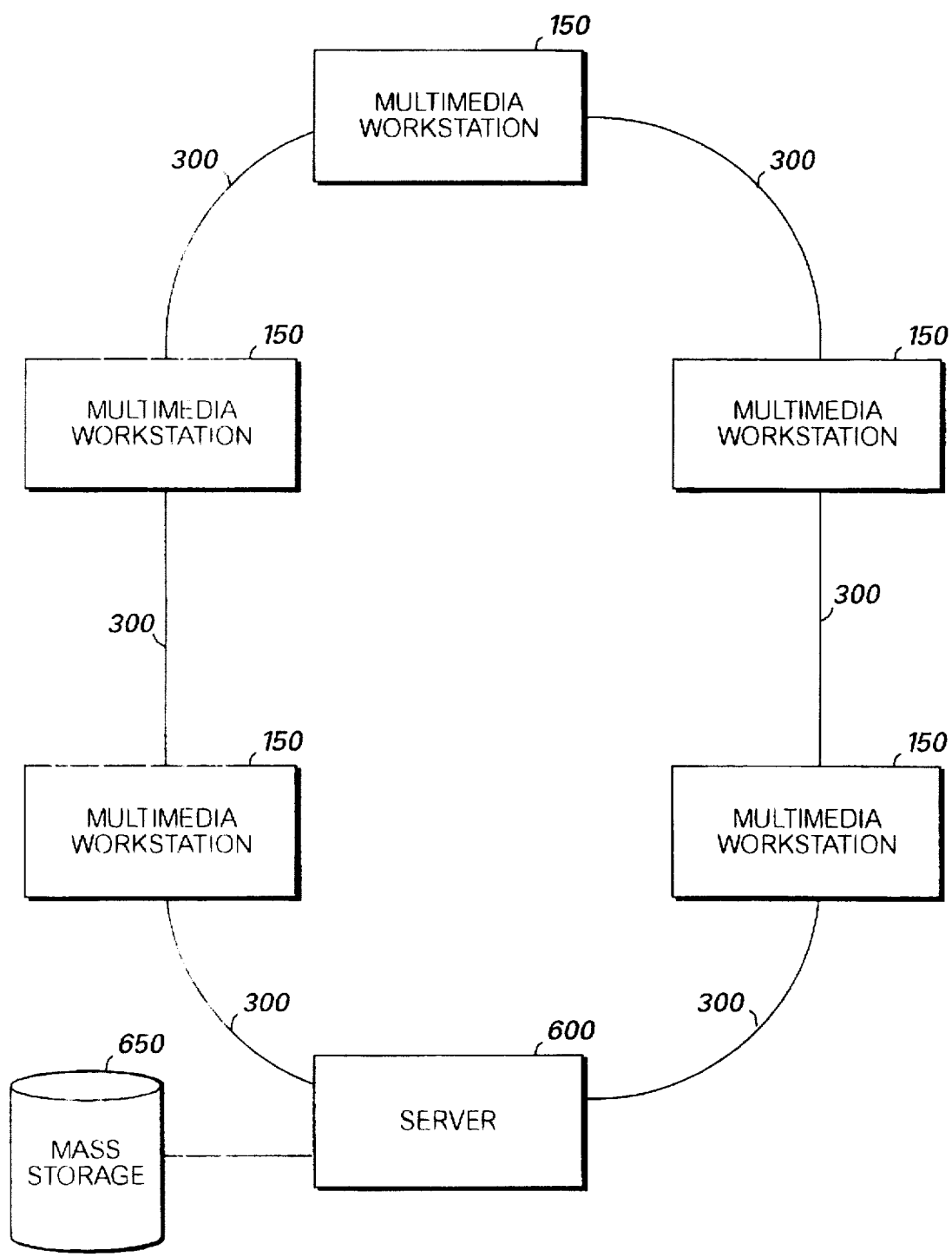
FIG. 3 is a block diagram showing the basic network configuration of the present invention.

FIG. 3 shows a preferred interconnection of the workstations 150 with a server 600 via the network 300 to form a working system. The server 600 has access to the fiber optic network 300, and may runs a multitasking operating system with threads for each of the workstations 150. The server 600 is also coupled to mass storage 650 which may hold the multimedia presentation information. In the embodiment depicted in FIG. 3, the workstations 150 are connected in a ring 300 to the server 600, which acts a network protocol master. The server 600 may rapidly poll the workstations 150 for input from their input devices 400, such as pointer devices, MSRs, and/or other serial input devices. The server 600 passes this information to controlling applications running on the server, which send via the network 300 the appropriate output, video, graphics, audio, or other data to the workstation(s) 150 that they control.

For example, an application on the server 600 may be a "video server" application that is responsible for playing movies to the users of the workstation 150. This application on the server 600 may take compressed MPEG data from the mass storage 650 and send it over the network 300 to the workstation(s) 150 that have users who will watch the movies. Each workstation 150 may have a different movie, as the application running on the sever 600 has control over what is sent to each workstation 150 through the network 300. As previously discussed, a user of a workstation 150 may, through the use of an input device 400, select which movie, or other multimedia content, is transmitted from the server 600/mass storage 650 to the workstation 150 through the network 300.

Figure 4:
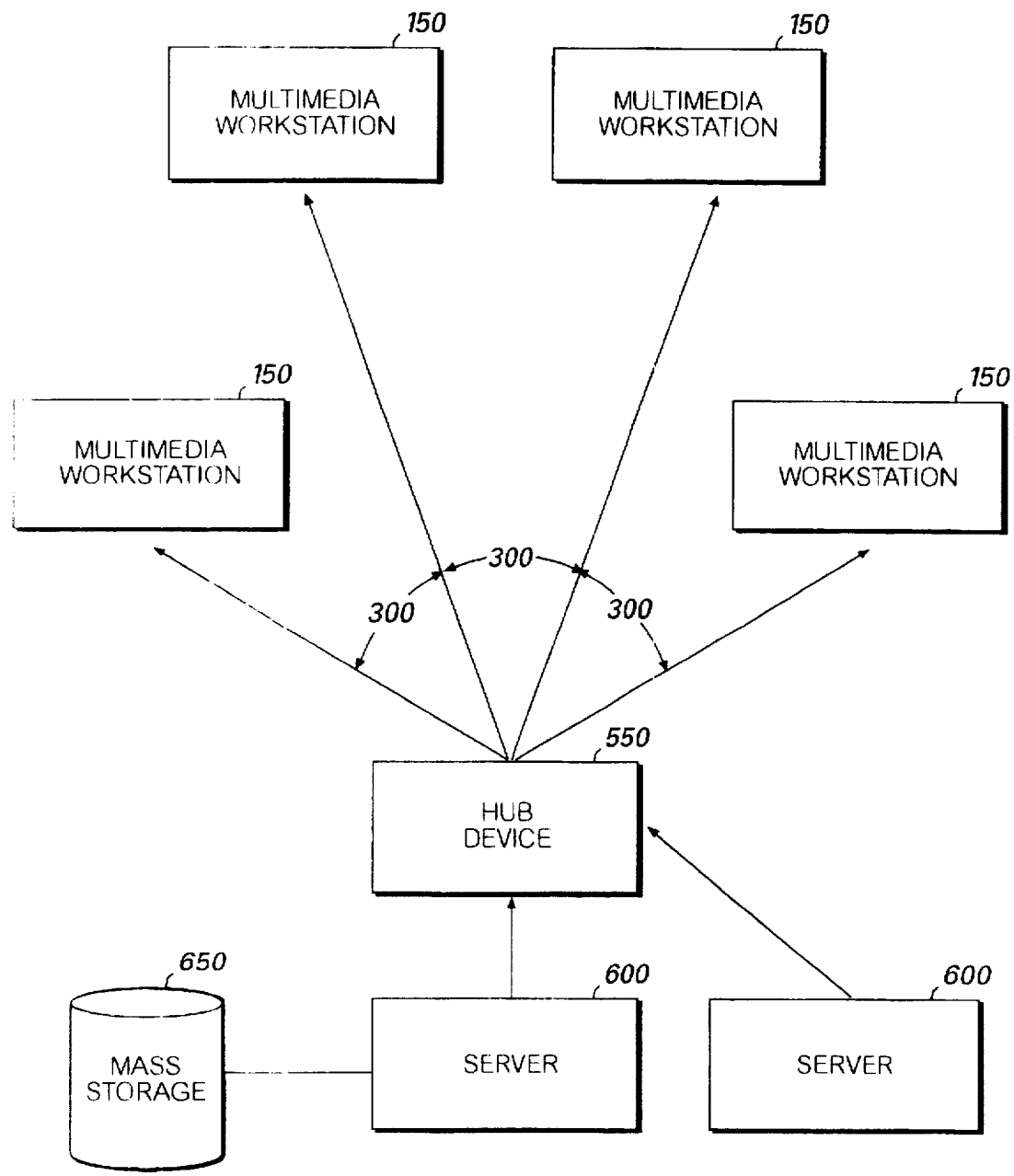
FIG. 4 is a block diagram showing an alternative networked configuration of the present invention.

FIG. 4 illustrates an alternate means of interconnection of workstations 150 to the server 600 via the network 150. Instead of the ring architecture of FIG. 3 which is well known to those skilled in the art of fiber optics, FIG. 4 shows a hub connection, which uses a hub device 350 to connect the workstations 150 to the server(s) 600 via the network 300. Although implementing the hub network configuration of FIG. 4 is typically more expensive than implementing the ring configuration of FIG. 3 (due to the additional cost of the hub device 350), FIG. 4 illustrates an alternate network configuration which will work according to the teachings of the present invention. Of course, those of ordinary skill in the art will readily recognize other suitable network configuration which may also be used to implement the present invention.

In a preferred embodiment, the server 600 may be an Intel x86 based computer with at least 16 Megabytes of DRAM, 1 Gigabytes of disk storage, and PCI adapter slots. The operating system for the server 600 may be Windows NT from Microsoft. This operating system is a true preemptive multitasking system, allowing for the server 600 to concurrently run processes for the multiple workstations 150 under its control. Alternate embodiments of the server 600 may include Power PC or DEC Alpha machines, which also run NT. Alternate operating systems for the server may include UNIX.

Figure 5:
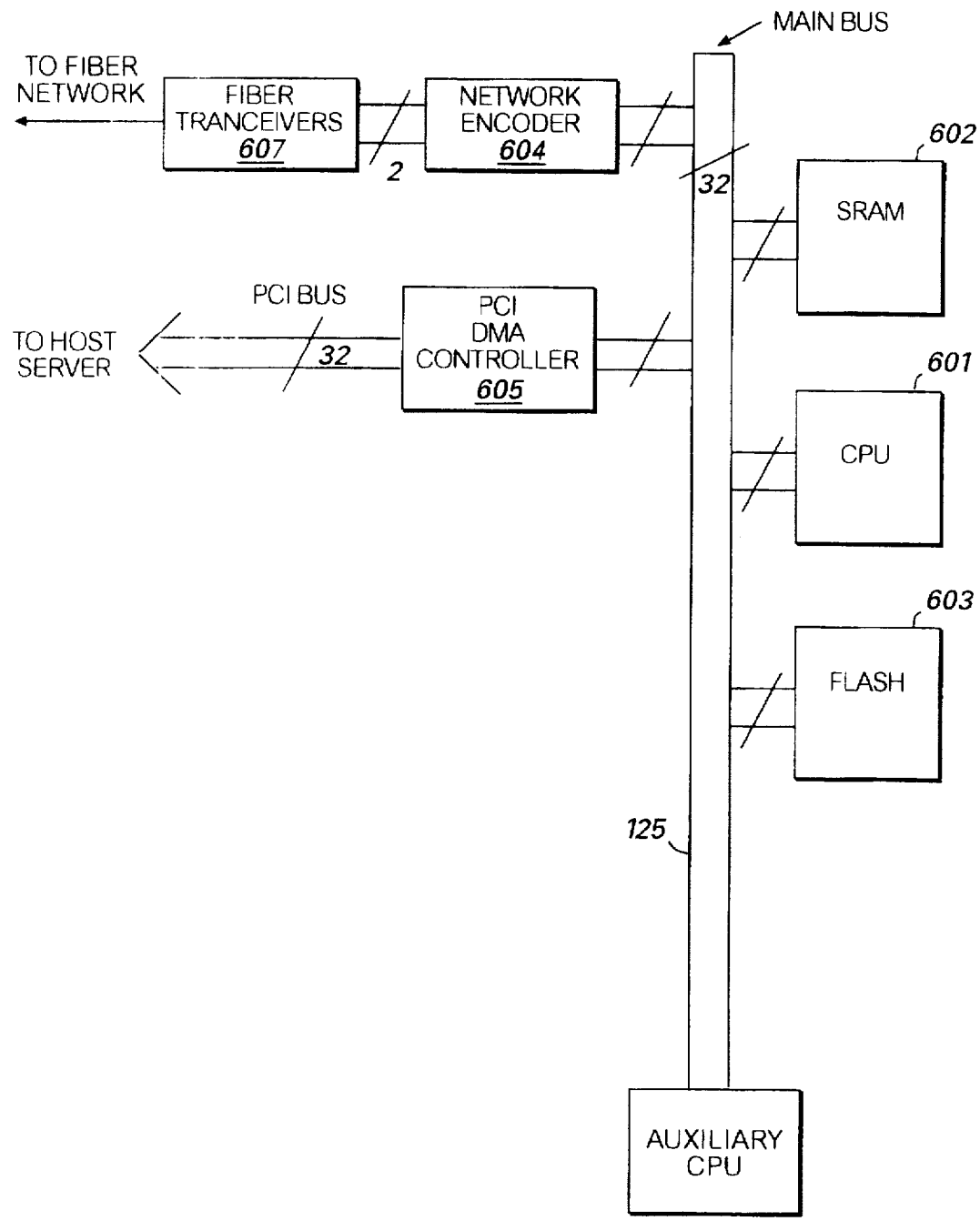
FIG. 5 is a block diagram showing a network adapter that may be used with the present invention.

As shown in FIG. 5, one of the PCI adapter slots of server 600 may be filled with a network adapter, which serves to couple the server 600 to the network 300. The network adapter of FIG. 5 may use a subset of the components found on the workstation 150. This allows for ease of manufacture and the commonality of code on the workstation 150 and the adapter card of FIG. 5.

Again, FIG. 5 summarizes the preferred embodiment of the network adapter. In one embodiment, it may be a PCI 2.0 compliant plug in card which acts as a bus mastering DMA device. The CPU 601, FLASH 603, network encoder 604, fiber transceivers 607, and 8 bit Auxiliary CPU 616 may be identical to their counterparts in the workstation 150 of FIG. 2. Due to buffering requirements, the SRAM 602 may be 1 Megabytes on the adapter. Also, the PCI DMA Controller 605 is made up of both the Xilinx 4010E part and a PCI9060 controller to allow DMAs to the PCI bus 125 of the host.

A preferred embodiment of the data format that may be transmitted by the server 600 to each workstation 150 via network 300 is shown in FIG. 6. Particularly, data may be broken into 4096 (4K) byte packets 670, each of which may have the following fields:

Destination Address (1 byte) 671
Source Address (1 byte) 672
Sequence Number (1 byte) 673
Packet Number (1 byte) 674
Message Type (1 byte) 675
Priority (1 byte) 676
Data Length (2 bytes) 677
MAC Data (4 bytes) 678
User Defined (4 bytes) 679
Actual Data (0.. 4096 bytes) 680

The various fields shown in FIG. 7 represent merely an exemplary format of a data packet that may be transmitted from the server 600 to each workstation 150 via the network. Variations may be made to these fields, including the type of fields and the number of bytes in each field.

A description of these fields is relatively straightforward. The destination address 671 may specify to which workstation 150 the data packet is being transmitted—1 byte allows 256 different possibilities (0 to 255), and of course more than 1 byte may be used to increase the number of addressable workstations 150. In one embodiment, bit 7 of the destination address 671 may indicate a global address, and the value 0 is not allowed. Therefore, in this embodiment, valid destination addresses 671 are 1 through 127, and any address from 128–255 is global. Examples of global addresses are those addresses that correspond to "All Workstations", "Selected Workstations", etc.

The source address 672 may specify from which server 600 the data packet is being transmitted. If there is more than one server 600, this field may be useful to the receiving workstation 150. Again, this field may include any selected number of bytes.

The sequence number 673 and packet number 674 may specify a relative ordering of a packet within a plurality of data packets. For example, the server 600 may transmit a plurality of data packets to a workstation 150, and it may be useful for the workstation 150 to be apprised of the sequencing for each packet 150, so that the packets may be reassembled back into the proper order by the workstation 150. Packet transmission may be divided up into sequences, with packet numbering occurring within each sequence, or any other similar numbering scheme.

The message type 675 may specify the type of message or data that is being transmitted within the data packet. This may be useful to a workstation 150 if different types of data are being transmitted, and the workstation 150 is to treat each type of data packet differently.

For example, sample message types 675 are listed below. These message types are listed as letters, which may be encoded as their ASCII equivalent or through some other scheme. Also, certain of these message types may cause the workstation 150 to refer to the user defined field 679 for other information to carry out the functionality of the message type:

Type "m": A data memory copy is to be performed by the workstation 150, where the user defined field 679 carries the address in video memory 109 (FIG. 2) where the graphics data in the data field 680 is to be copied. Data is simply copied from the network buffer 102 to the graphics frame buffer 109.

Type "t": A serial transmit is to be performed by the workstation, where the user defined field 679 carries the serial port 118 number. Raw data is queued to the requested serial port 118 for transmission to a peripheral.

Type "v": MPEG video data is to be transmitted to the workstation 150. The MPEG data is passed unfiltered to the hardware decoder 114.

Type "s": The server 600 is polling a workstation 150 for its status. The workstation 150 appends its incoming data and hardware status to the data portion 680 of the data packet and forwards it back to the server 600. This is described in further detail below with respect to FIG. 7.

Referring again to FIG. 6, the priority field 676 may specify a relative priority of the data packet, which may be used by a workstation 150 to prioritize multiple incoming data packets of differing priority. The data length 677 may specify the actual length of the data 680 that is being transmitted in the packet. While the data packet of FIG. 6 may, in one embodiment, contain from 0 to 4096 bytes, if the data field 680 is only partially filled, the data length 677 may be specified so that the workstation 150 is apprised of the actual length.

The MAC data 678 may be reserved for the network server 600 to transmit useful information about network status such as breaks in the network ring 300, system time, and other such information as may be needed by the software operating on the workstation computer 100.

Finally, the data field 680 carries the actual data that is being transmitted from the server 600 to the workstation 150 via the network 300. This data field 680 may contain raw graphics images, sound, or any other type of multimedia content, which may be transmitted between the server 600 and the workstation 150, and displayed on a video display 200, etc., as previously described.

The 4096 data packet length is chosen as a natural page size for the Intel x86-class processors, and allows for easy coding of DMAs to the physical memory. In one embodiment, a 16 byte header is used, which provides for less than 1% overhead.

FIG. 7 is a timing diagram that depicts a sample series of communications via the network 300 between the server 600 and a workstation 150. In step 701, a user of the workstation 150 (FIG. 1) presses the touchscreen 400, or otherwise provides input to the computer 100 via input device 400. For example, the user may select a movie to be displayed on the video display 200, or may request some other type of multimedia presentation to be made on the workstation 150. Alternatively, the user may interact with the workstation 150 in order to complete some type of transaction (e.g., to purchase some goods, etc.).

After the user performs some action in step 701, raw serial data corresponding to the information provided by the user via device 400 is received on the serial port 118 of the workstation 150. This data may then be queued up within memory 102 (or other memory within the workstation 150) at step 703.

At a later time, a timer in the server 600 may reach a certain point indicating that the server 600 is to poll one or more workstations 150. This polling is performed in order to determine whether a workstation 150 has any data queued to be sent to the server 600. At step 705, the server 600 generates a polling message to be sent to the workstation(s) 150, and at step 706 the poll message is actually sent to the workstations 150 via the network 300. In one embodiment, the poll message may take the form of a data packet as shown in FIG. 6.

At step 707, having received the poll message from the server 600, the workstation 150 appends the raw serial data in its memory queue to the poll message, and at step 708 the workstation 150 transmits this poll answer back to the server 600 via the network 300. At step 709, the server 600 sends the raw data received from the workstation 150 to the particular application running on the server 600 that is handling such poll answers. At step 710, the raw data is processed into a touch point. In other words, raw encoded data from the pointing device 400 is translated into a coordinate relative to the screen 200. For example, touching somewhere in the left top corner of a 640×480 screen may produce a coordinate such as (17,32), whereas touching somewhere in the right bottom corner of a 640×480 screen may produce a coordinate such as (601,423).

At step 711 the application makes a decision as to how to handle the raw data received from the workstation 150.

In response to the raw data received from the workstation 150, at step 712, the application running on the server 600 thereafter queues in memory 602 raw data corresponding to graphics images, audio, etc. that will be sent to the workstation 150 in response to the workstation 150 user's initial request. Information regarding which workstation 150 will be receiving this raw data is also queued, typically corresponding to the workstation 150 from where the request was received. This information may be placed into the destination address field 671 (FIG. 6).

At step 713, the server 600 arbitrates for bandwidth on the network 300 for the upcoming transmission to the workstation 150 of the queued data. Once bandwidth becomes available on the network 300, in steps 714-716 the data is packetized and transmitted to the workstation 150 via the network 300. Finally, in step 717, the graphics and other type of raw data received by the workstation 150 from the server is copied directly to the video frame buffer 109, as previously described.

The person of ordinary skill will recognize that the timing diagram of FIG. 7 illustrates merely typical communication events that may be performed in accordance with the teachings of the present invention. The above described embodiments are given as illustrative examples only. It will be readily appreciated that many deviations may be made from the specific embodiments disclosed in this specification without departing from the scope of the invention. Accordingly, the scope of the invention is to be determined by the claims below rather than being limited to the specifically described embodiments above.

We claim:

1. A system for delivering multimedia services across a high-speed data network, comprising:

(a) a high-speed data network;

(b) a server coupled to the high-speed data network for generating non-protocol-based multimedia data and for transmitting data packets representing the multimedia data over the high-speed data network; and (c) a multimedia workstation coupled to the high-speed data network, the multimedia workstation comprising a graphics frame buffer, having a selected data format, a video display, an input device and a processing device, wherein the processing device performs the steps of:

(i) receiving a signal from the input device;

(ii) transmitting the signal to the server;

(iii) receiving the data packets transmitted over the high-speed network, wherein the data packets are associated at the server with the signal transmitted to the server and wherein the data packets are transmitted as raw data in a format corresponding to the graphics frame buffer selected data format;

(iv) storing the data packets in the graphics frame buffer; and (iii) displaying on the video display the multimedia data represented by the data packets stored in the graphics frame buffer.

2. The system of claim 1, wherein the high-speed data network comprises a fiber-optic network.

3. The system of claim 1, wherein the high-speed data network comprises a ring architecture.

4. The system of claim 1, wherein the high-speed data network comprises a hub architecture.

5. The system of claim 1, wherein the server further comprises a mass storage device for storing the multimedia data.

6. The system of claim 1, wherein the server further comprises:

(i) memory means for storing the multimedia data; and (ii) a direct memory access device for transmitting as data packets the multimedia data directly from the memory means to the high-speed data network.

7. The system of claim 1, wherein the server operates under an operating system selected from one of the following: Microsoft Windows NT or Unix.

8. The system of claim 1, wherein the video display comprises a cathode ray tube monitor.

9. The system of claim 1, wherein the multimedia data comprises successive digitized graphics images each having a resolution of 640 by 480 pixels.

10. The system of claim 9, wherein the graphics frame buffer includes at least 1 megabyte of storage.

11. A system for delivering multimedia services across a high-speed data network, comprising:

(a) a high-speed data network;

(b) a server coupled to the high-speed data network for generating non-protocol-based multimedia data and for transmitting data packets representing the multimedia data over the high-speed data network; and (c) a multimedia workstation coupled to the high-speed data network, the multimedia workstation comprising:
  (i) a graphics frame buffer, having a selected data format;
  (ii) a video display;
  (iii) means for receiving input signals from a user of the multimedia workstation and for transmitting the input signals to the server over the high-speed data network; and
  (iv) a processing device for receiving the data packets transmitted over the high-speed network, wherein the data packets are associated at the server with the input signal transmitted to the server, for storing the data packets in the graphics frame buffer, and for displaying on the video display the multimedia data represented by the data packets stored in the graphics frame buffer, and wherein the data packets are transmitted as raw data in a format corresponding to the graphics frame buffer selected data format;

wherein the server generates the multimedia data, and transmits the data packets representing the multimedia data, responsive to the input signals received from the multimedia workstation.

12. A system for delivering multimedia services across a high-speed data network, comprising:

(a) a high-speed data network;

(b) a server coupled to the high-speed data network for generating MPEG video data and for transmitting data packets representing the MPEG video data over the high-speed data network; and (c) a multimedia workstation coupled to the high-speed data network, the multimedia workstation comprising a graphics frame buffer, having a selected data format, a video display, an input device and a processing device, wherein the processing device performs the steps of:
  (i) receiving a signal from the input device;
  (ii) transmitting the signal to the server;
  (iii) receiving the data packets transmitted over the high-speed network, wherein the data packets are associated at the server with the signal transmitted to the server, and wherein the data packets are transmitted as raw data in a format corresponding to the graphics frame buffer selected data format;
  (iv) storing the data packets in the graphics frame buffer in the format that they are received from the high-speed network; and
  (v) displaying on the video display the MPEG video data represented by the data packets stored in the graphics frame buffer.

13. A method for delivering multimedia services between a server and a multimedia workstation across a high-speed data network, the multimedia workstation including a graphics frame buffer, a video display and an input device, comprising the steps of:

(a) receiving a signal from the input device;

(b) transmitting the signal from the multimedia workstation to the server;

(c) generating non-protocol-based multimedia data within the server, wherein the multimedia data is associated at the server with the signal transmitted to the server;

(b) transmitting data packets representing the multimedia data from the server over the high-speed network in a format corresponding to a graphics frame buffer selected data format;

(c) receiving at the multimedia workstation the data packets transmitted over the high-speed network;

(d) storing the data packets in a graphics frame buffer within the multimedia workstation in the graphics frame buffer selected data format; and (e) displaying on the video display within the multimedia workstation the multimedia data represented by the data packets stored in the graphics frame buffer.

14. A method for delivering multimedia services between a server and a multimedia workstation, wherein the server and the multimedia workstation are coupled to each other via a high-speed data network, and wherein the multimedia workstation including a graphics frame buffer and a video display, comprising the steps of:

(a) generating a multimedia request signal at the multimedia workstation;

(b) transmitting a polling signal from the server to the multimedia workstation across the high-speed data network;

(c) transmitting the multimedia request signal from the multimedia workstation to the server, responsive to the transmission of the polling signal;

(d) generating non-protocol-based multimedia data within the server, wherein the multimedia data corresponds to the multimedia request signal and is in a format corresponding to a graphics frame buffer selected data format;

(e) transmitting from the server data packets representing the multimedia data over the high-speed network;

(f) receiving at the multimedia workstation the data packets transmitted over the high-speed network;

(g) storing the data packets in the graphics frame buffer within the multimedia workstation in the graphics frame buffer selected data format; and (h) displaying on the video display within the multimedia workstation the multimedia data represented by the data packets stored in the graphics frame buffer.

\* \* \* \* \*